United States Patent [19]
Cluff et al.

[11] 3,821,143
[45] June 28, 1974

[54] HOT MELT ADHESIVE COMPOSITION CONTAINING A BRANCHED ELASTOMERIC COPOLYMER

[75] Inventors: Edward Fuller Cluff; Austin Matthew Snow, Jr., both of Wilmington, Del.

[73] Assignee: E. I. Du Pont de Nemours and Company, Wilmington, Del.

[22] Filed: Mar. 22, 1973

[21] Appl. No.: 343,683

[52] U.S. Cl. .... 260/28.5 B, 260/27 BB, 260/28.5 A
[51] Int. Cl. .................................................. C08f 45/52
[58] Field of Search ........ 260/28.5 A, 28.5 B, 27 R, 260/27 BB

[56] References Cited
UNITED STATES PATENTS

| | | | |
|---|---|---|---|
| 2,933,480 | 4/1960 | Gresham | 260/28.5 A |
| 3,220,966 | 11/1965 | Flanagan | 260/27 |
| 3,321,428 | 5/1967 | Tordella | 260/28.5 A |

*Primary Examiner*—Allan Lieberman
*Assistant Examiner*—P. R. Michl

[57] ABSTRACT

A hot melt adhesive composition comprising, in parts by weight, about:
  a. 100 parts of petroleum wax,
  b. 40 to 200 parts of a tackifying resin, and
  c. 15 to 100 parts of a branched elastomeric copolymer of ethylene, at least one $C_3$ to $C_{18}$ alpha-olefin, at least one direactive nonconjugated diene, and optionally at least one mono-reactive nonconjugated diene; said copolymer having a Mooney viscosity of about 10 to 70.

9 Claims, No Drawings

HOT MELT ADHESIVE COMPOSITION CONTAINING A BRANCHED ELASTOMERIC COPOLYMER

BACKGROUND OF THE INVENTION

This invention relates to hot melt adhesive compositions, and more particularly to hot melt adhesive compositions containing an elastomeric ingredient.

Hot melt adhesives, commonly referred to as hot melts, have found wide industrial acceptance for use in laminating various substrates such as paper, cardboard, and metal foils. Hot melts are generally mixtures of wax, tackifying ingredients, polymeric materials, and optionally other ingredients such as antioxidants. The hot melts are solid at room temperatures and bonding is accomplished by heating the adhesive composition to form a flowable tacky melt, applying the melt to a substrate to form a coating thereon, placing a second substrate on the hot melt coating, and cooling the resulting laminate to a temperature below the melt temperature of the adhesive composition to form an adhesive bond between the substrates.

The art has often suggested inclusion of an elastomeric polymer in hot melt adhesive compositions. Elastomeric ethylene/propylene dipolymers and terpolymers have been proposed, for instance, because of their excellent modulus and tensile properties and compatibility with other ingredients in the hot melt composition. Hot melts containing these polymers, however, have had too high a viscosity at the desired level of elastomer content for use in many conventional adhesive applicators.

In case sealing, for instance, the hot melt adhesive is generally applied under pressure through a nozzle at relatively low shear. The hot melt usually must have a viscosity in the order of 100 to 10,000 centipoise at application conditions in order that adequate amounts of adhesive to accomplish sealing will be applied within a reasonable time. Prior art hot melt compositions containing elastomeric ethylene-propylene copolymers have generally had viscosities much higher than this range, such as 50,000 centipoise or higher, at the desired concentration of elastomer in the hot melt compositions.

Consequently, hot melt adhesives containing ethylene-propylene have not found acceptance for use in low viscosity applications, such as case sealing, despite many other excellent properties.

SUMMARY OF THE INVENTION

It has now been found that hot melt adhesive compositions containing, as an elastomeric component, a branched copolymer of ethylene, at least one $C_3$ to $C_{18}$ alpha-olefin, at least one direactive diene, and optionally at least one mono-reactive nonconjugated diene have a lower viscosity than hot melts heretofore known which contained a linear ethylene/propylene dipolymer or EPDM terpolymer.

Accordingly, this invention provides a hot melt adhesive composition comprising, in parts by weight:
  a. 100 parts of petroleum wax,
  b. 40 to 200 parts of a tackifying resin, and
  c. 15 to 100 parts of a branched elastomeric copolymer of ethylene, at least one $C_3$ to $C_{18}$ alpha-olefin, at least one direactive nonconjugated diene, and optionally at least one mono-reactive nonconjugated diene; said copolymer having a Mooney viscosity of about 10 to 70.

DESCRIPTION OF THE INVENTION

The hot melt adhesive compositions of this invention possess the excellent physical properties of high modulus, high tear strength, and compatibility of ingredients characteristic of hot melt compositions containing a linear ethylene/propylene copolymer. The melt viscosity is, however, substantially reduced.

Based on petroleum wax, these novel hot melt adhesive compositions comprise, in parts by weight:
  a. 100 parts of petroleum wax,
  b. 40 to 200 parts of a tackifying resin, and
  c. 15 to 100 parts of a branched elastomeric copolymer of ethylene, at least one $C_3$ to $C_{18}$ alpha-olefin, at least one direactive nonconjugated diene, and optionally at least one mono-reactive nonconjugated diene.

As used herein, the term "petroleum wax" refers to both paraffin wax and microcrystalline waxes as well as equivalent synthetic waxes.

Paraffin wax is a mixture of solid hydrocarbons derived from the overhead wax distillate fraction obtained from the fractional distillation of petroleum. After purification, the paraffin wax contains hydrocarbons that generally fall within the formula $C_{23}H_{48}$ — $C_{35}H_{72}$. Paraffin wax is a substantially colorless, hard, translucent material usually having a melting point of about 52° to 85°C. Microcrystalline wax is obtained from the nondistillable still residues from the fractional distillation of petroleum. It differs from paraffin wax in having branched hydrocarbons of higher molecular weights. It is considerably more plastic than paraffin wax and usually has a melting point of about 66° to 93°C. Also useful are synthetic waxes such as Fischer-Tropsch wax.

Use of tackifying resins in hot melt adhesives is well known in the art, and conventional resins compatible with both the selected wax and branched elastomeric copolymer can be used to advantage. By "compatible" is meant that the resin should not part to form a separate phase when the composition is heated to form a melt. The tackifying resin should be present in the amount of about 40 to 200 parts, and preferably 100 to 150 parts per 100 parts of wax.

Representative tackifying resins which can be used with advantage include natural rosins such as gum rosin, wood rosin, and tall wood rosin; hydrogenated wood rosin; esters of natural rosins such as methyl and glyceryl esters of wood rosins; and methylated paraffinic chain hydrocarbon resins. Particularly useful are the aliphatic petroleum hydrocarbon resins prepared by polymerizing olefins and diolefins. These hydrocarbon resins generally have a Ring and Ball softening point of from 10° to 135°C. Commercially available resins of this type include synthetic polyterpene resins, such as "Wing-Tack" 95 sold by Goodyear Chemicals. Other commercially available resins are "Betaprene" H resins sold by Reichold Chemical Corporation.

Additional useful tackifying resins include hydrocarbon resins prepared by polymerizing fractions of crude oil, such as "Piccotac" resins sold by Pennsylvania Industrial Chemical Corporation; and terprene polymers having a ball and ring softening point of about 10° to 135°C. Other tackifying resins will be known to those skilled in the art.

The branched elastomeric polymer is a copolymer of ethylene, a $C_3$ to $C_{18}$ alpha-olefin, and at least one direactive nonconjugated diene. By "direactive" is meant that the diene will copolymerize with other monomers present during polymerization through both of its double bonds. Optionally, a monoreactive diene can be present during polymerization. By "monoreactive" is meant that only one of the diene double bonds will enter the polymerization reaction. These branched copolymers can be prepared by polymerizing the monomers in an inert solvent in the presence of a coordination catalyst, as disclosed in Canadian Pat. No. 855,774 to Campbell and Thurn.

Propylene is the preferred alpha-olefin, although other alpha-olefins such as 1-hexene, 1-butene, 1-decene, and 1-dodecene can be selected with advantage. Representative direactive dienes copolymerized to introduce branching include monomers having two terminal double bonds, such as 1,4-pentadiene; 1,5-hexadiene; and 1,7-octadiene. The direactive diene can also be a strained-ring diolefin, such as the reaction product of norbornadiene-2,5 and cyclopentadiene, or preferably 2,5-norbornadiene. Representative monoreactive dienes which may optionally be copolymerized include cycloaliphatic compounds such as 5-ethylidene-2-norbornene, 5-methylene-2-norbornene, and 5-propenyl-2-norbornene; and nonconjugated aliphatic diolefins such as 1,4-hexadiene, 1,9-octadiene, and the like.

Suitable branched copolymers have a Mooney viscosity ML − 1 + 4/121°C. of about 10 to 70, and most preferably about 18 to 30. When the hot melt is to be used in applications such as in case sealing, branched copolymers having gel particles large enough to plug the nozzle orifice should be avoided. Gel content and gel particle size is conveniently reduced by decreasing the quantity of direactive diene in the polymer.

When propylene is selected as the alpha-olefin, the branched polymer generally contains about 40 to 80 percent by weight ethylene, about 0.01 to 0.5 mole direactive diene per kilogram of copolymer, and optionally about 0 to 2 moles monoreactive diene per kilogram of copolymer. The balance is propylene. Preferred copolymers have about 70 to 74 percent by weight ethylene and about 0.1 to 0.3 mole direactive diene per kilogram of copolymer, with the preferred direactive diene being 2,5-norbornadiene. Preferably, as in the case of 1,4-hexadiene, the monoreactive diene is present in about 0 to 6 percent by weight. The balance is propylene.

The branched copolymer should be present in at least about 15 parts per 100 parts of wax to achieve flexible bonding. Generally, additions in excess of 100 parts per 100 parts of wax will not increase performance of the adhesive composition. Preferably, the adhesive composition will contain about 20 to 50 parts branched copolymer per 100 parts wax.

Minor amounts of thermal stabilizers such as antioxidants, and of conventional adhesion promoters can be included in the adhesive composition to enhance physical properties. Polypropylene plasticizer can be used in place of a part of the branched copolymer to further reduce viscosity of the hot melt adhesive without undue loss of physical properties. Extender oils, such as a paraffinic petroleum oil, can be used to like advantage, if desired.

The hot melt adhesive composition is conveniently prepared in an agitated, oil-jacketed kettle heated at about 163° to 191°C. First the wax and resin are introduced and allowed to melt. Then the branched polymer is added and mixing is continued until it dissolves. Finally, the optional adhesion promoters and antioxidants are added. When the resulting stirred mixture is homogeneous, it is poured and allowed to cool.

Alternatively, an internal mixer, such as one having a sigma blade, can be employed. In this case the polymer is added before the wax. The optional adhesion promoters and antioxidants are then introduced. At least 30 minutes of mixing is generally required to ensure a homogeneous melt.

When the hot melt composition is to be used in case sealing, it is generally desired that the composition have a viscosity of about 100 to 10,000 centipoise as measured at 190°C. with an RTV Brookfield Thermosel viscometer using a No. 21 spindle at 20 rpm. Melt viscosity is adjusted for the particular branched copolymer and application equipment by varying the ratio of wax and tackifying resin to branched polymer within the limits hereinbefore prescribed. In general, the hot melt viscosity is decreased by an increase in proportions of wax or tackifying resin.

Hot melt compositions of this invention having a viscosity higher than about 10,000 can be used in other adhesive applications, such as those employing a wheel or gear applicator. To increase viscosity of the hot melt composition, the quantity of branched copolymer relative to wax and tackifying resin is increased.

In the examples that follow, all parts and percents are by weight unless otherwise indicated. Viscosity measurements are as taken with an RVT Brookfield Thermosel viscometer using a No. 27 spindle unless otherwise indicated. Ring and Ball softening points are determined following the procedures of ASTM E-28-58T.

EXAMPLE 1

A. The synthetic resin used is a polyterpene resin having a Ring and Ball softening point of 100° ± 5°C., sold as "Wingtack" 95 by Goodyear Chemicals. The petroleum wax used is a fully refined paraffinic wax having a melt point of 61°C. (ASTM Test Method D-87). The branched elastomeric tetrapolymer used has the following monomer unit composition: ethylene, 72.75%; propylene, 23%; 2,5-norbornadiene, 0.15%; and 1,4-hexadiene, 4.1%. This tetrapolymer has an inherent viscosity of 1.25 at 30°C. (measured on a solution of 0.1 gram of tetrapolymer in 100 ml. of tetrachloroethylene), and a Mooney viscosity (ML − 1 + 4/121°C.) of 19.

A 2-gallon agitated, oil-jacketed mixing kettle is heated to about 177°C. and charged with 100 parts of "Wingtack" 95 and 100 parts of refined paraffinic wax. When these components have melted, 40 parts of tetrapolymer are slowly added. When the resulting stirred mixture has become homogeneous, it is poured and allowed to cool. For test purposes, a portion of the mixture is collected on a stainless steel tray, cooled, and cut into one-inch squares when solid. Typical results of viscosity measurements are recorded in Table 1.

TABLE 1

| COMPOSITION | | PROPERTIES | | |
|---|---|---|---|---|
| Ingredient | Parts | Ball and Ring Softening Point: 63–65°C. | | |
| | | Temp., °C. | Spindle Speed, rpm | Viscosity, cps |
| Branched Tetrapolymer | 40 | 163 | 100 | 2415 |
| Resin | 100 | 177 | 100 | 1730 |
| Wax | 100 | 190 | 100 | 1275 |
| | 240 | 204 | 100 | 920 |

B. For comparison, a hot melt adhesive composition is prepared using the resin and wax and following the procedures of Part A except that a linear elastomeric ethylene, propylene, 1,4-hexadiene terpolymer (72% ethylene, 25.2% propylene, 2.8% 1,4-hexadiene; ML — 1 + 4/121°C. of 60) is substituted for the branched tetrapolymer. Typical results of testing are recorded in Table 2.

TABLE 2

| COMPOSITION | | PROPERTIES | | |
|---|---|---|---|---|
| Ingredient | Parts | Ball and Ring Softening Point: 65–78°C. | | |
| | | Temp., °C. | Spindle Speed,[1] rpm | Viscosity, cps |
| Linear Terpolymer | 40 | 163 | 2.5 | 66,500 |
| Resin | 100 | 177 | 2.5 | 49,500 |
| Wax | 100 | 177 | 5.0 | 48,700 |
| | 240 | 190 | 5.0 | 37,000 |
| | | 204 | 5.0 | 24,250 |
| | | 204 | 10.0 | 22,000 |

(1) Viscosity is so high that no spindle speed above 10 rpm is suitable.

Comparison of Tables 1 and 2 shows that the hot melt adhesive composition containing branched elastomeric tetrapolymer has an unexpectedly low viscosity in comparison to similar hot melt compositions containing a linear elastomeric terpolymer.

C. Bonding Corrugated Paperboard

The hot melt adhesive of Part A is placed in the reservoir of a "Nordson" Hot Melt Applicator Mark IV, heated to about 163° to 191°C., conveyed to a heated nozzle tip, and propelled by air onto a corrugated paperboard to form four (4) beads of pencil width. A second corrugated paperboard is held against the first for about 2 to 6 seconds to distribute the beads on both surfaces (compression section). Pressure is then removed. The paperboards are very satisfactorily bonded together by the adhesive.

EXAMPLE 2

Hot melt adhesive compositions are formulated using the branched tetrapolymer and procedures of Example 1 and using a variety of fully refined paraffin waxes and resins. Viscosity measurements are taken on these compositions at 190°C. using a number 21 spindle at 20 rpm. Results are recorded in Table 3.

TABLE 3

| Ingredient | | A | B | C | D |
|---|---|---|---|---|---|
| Branched tetrapolymer | | 40 | 40 | 40 | 40 |
| Petroleum hydrocarbon resin[1] | | 100 | — | — | — |
| Synthetic polyterpene resin[2] | | — | 100 | 100 | 100 |
| | M.P. (3) | | | | |
| Fully refined | 61°C. | 100 | 100 | — | — |
| Paraffin | 70°C. | — | — | 100 | — |
| Wax | 84°C. | — | — | — | 100 |
| Adhesion promoter[4] | | 2.0 | 2.0 | 2.0 | 2.0 |
| 2,6 Ditertiary butyl-4-methyl phenol | | 2.4 | 2.4 | 2.4 | 2.4 |
| Boric acid powder | | 2.4 | 2.4 | 2.4 | 2.4 |
| Viscosity, cps | | 1945 | 1545 | 1867 | 2345 |

(1) Ring and Ball Softening Point 119°C.; "Piccotac" A, Pennsylvania Industrial Chemical Corporation.
(2) Ring and Ball Softening Point 100 ± 5°C.; "Wing-Tack" 95, Goodyear Chemicals.
(3) Melting Point, ASTM Test Method D-87.
(4) Maleic Anhydride Grafted Polyethylene; "Epolene" C-16, Eastman Chemical.

EXAMPLE 3

To demonstrate extensibility of the hot melt compositions, polypropylene is added to a hot melt in the proportions shown in Table 4. The polypropylene has a peak melting temperature of 157½°C. as measured by differential scanning calorimetry with a heating rate of 10°C./min. The branched tetrapolymer, wax and tackifying resin are as identified in Example 1. Extended compositions B, C and D are tested for Brookfield viscosity, Lap Shear Temperature and Peel Temperature. The same tests are conducted on nonextended composition A. Test results are recorded in Table 4.

Peel temperature is determined by applying a strip of test adhesive, 3.2 mm. wide by 0.005 mm. thick, on a 30–16/ream (49 g/m$^2$) Kraft paper. A second sheet of the same paper is placed in direct alignment with the first sheet and heat-sealed to it. The bonded papers are cut, perpendicular to the bond line, into 2.54 cm. wide strips. Duplicate bonded specimens are placed in an oven with one free end of the specimen attached to a fixed support. A 100 g. load is suspended from the other free end. Tests are initiated at room temperature (24°C.). The oven temperature is then increased in 5°C. increments at 5 min. intervals. The temperature at which bond delamination occurs is specified as the peel temperature. Lap Shear temperature is determined in the same manner as the "Peel Temperature" except that White Richford Blank cardboard (14 × 22 inch, 10 ply) is used and the sheets are bonded at perpendicular alignment.

TABLE 4

|  | COMPOSITION | | | |
| --- | --- | --- | --- | --- |
|  | A | B | C | D |
| Branched Tetrapolymer | 80 | 40 | 60 | 80 |
| Boric Acid | 4.8 | 4.8 | 4.8 | 4.8 |
| 2,6 Ditertiary butyl-4-methyl phenol | 4.8 | 4.8 | 4.8 | 4.8 |
| Maleic Anhydride Grafted Polyethylene | 4.0 | 4.0 | 4.0 | 4.0 |
| Polypropylene | — | 40 | 40 | 80 |
| Wax | 200 | 200 | 200 | 200 |
| Tackifying Resin | 200 | 200 | 200 | 200 |
| Brookfield Viscosity, 190°C.,cps. | 1882 | 272 | 847 | 1865 |
| Lap Shear Temperature, °C. | 70 | 70 | 70 | 71 |
| Peel Temperature | 46 | 45 | 42 | 42 |

Table 4 demonstrates that the hot melt composition can be extended without adverse effect on Lap Shear or Peel Temperature.

We claim:

1. A hot melt adhesive composition comprising, in parts by weight, about:
   1. 100 parts of petroleum wax;
   2. 40 to 200 parts of a tackifying resin; and
   3. 15 to 100 parts of a branched elastomeric copolymer containing about 40 to 80 percent by weight of ethylene, about 0.01 to 0.5 mole of a direactive nonconjugated diene per kilogram of copolymer, and about 0 to 2 moles of a monoreactive nonconjugated diene per kilogram of copolymer, the balance of the copolymer being propylene; said copolymer having a Mooney viscosity of about 10 to 70.

2. The composition of claim 1 wherein the direactive diene is 2,5-norbornadiene.

3. The composition of claim 1 wherein the direactive diene is 1,7-octadiene.

4. The composition of claim 1 having a viscosity at 190°C. of about 100 to 10,000.

5. The composition of claim 4 comprising about:
   1. 100 parts of petroleum wax;
   2. 100 to 140 parts of a tackifying resin;
   3. 20 to 50 parts of a branched elastomeric copolymer having a Mooney viscosity of about 18 to 30 and containing about 0.1 to 0.3 mole direactive nonconjugated diene per kilogram of copolymer.

6. The composition of claim 5 wherein the direactive diene is 1,7-octadiene.

7. The composition of claim 5 wherein the direactive diene is 2,5-norbornadiene.

8. The composition of claim 5 wherein the branched elastomeric copolymer contains about 70 to 74 percent by weight ethylene, about 0.1 to 0.3 mole 2,5-norbornadiene per kilogram of copolymer, up to 6 percent by weight 1,4-hexadiene, the balance being propylene.

9. The composition of claim 5 containing at least one of polypropylene and an extender oil.

* * * * *